(12) United States Patent
Yokoyama

(10) Patent No.: US 12,472,298 B2
(45) Date of Patent: Nov. 18, 2025

(54) PERCUTANEOUS CATHETER

(71) Applicant: TERUMO KABUSHIKI KAISHA, Tokyo (JP)

(72) Inventor: Kenji Yokoyama, Kanagawa (JP)

(73) Assignee: Terumo Kabushiki Kaisha, Tokyo (JP)

( * ) Notice: Subject to any disclaimer, the term of this patent is extended or adjusted under 35 U.S.C. 154(b) by 398 days.

(21) Appl. No.: 18/107,629

(22) Filed: Feb. 9, 2023

(65) Prior Publication Data
US 2023/0191014 A1 Jun. 22, 2023

Related U.S. Application Data

(63) Continuation of application No. PCT/JP2021/034717, filed on Sep. 22, 2021.

(30) Foreign Application Priority Data

Sep. 30, 2020 (JP) .................. 2020164487

(51) Int. Cl.
*A61M 1/36* (2006.01)
*A61M 25/00* (2006.01)
(Continued)

(52) U.S. Cl.
CPC ........ *A61M 1/3659* (2014.02); *A61M 25/005* (2013.01); *A61M 60/13* (2021.01);
(Continued)

(58) Field of Classification Search
CPC ........ F16L 11/00; F16L 11/005; F16L 11/112; F16L 11/08; F16L 11/10; F16L 13/141; F16L 13/142; F16L 13/143; F16L 13/16; F16L 13/161; A61M 25/005; A61M 25/0012; A61M 25/0045; A61M 25/00; A61M 1/3659; A61M 25/0067;
(Continued)

(56) References Cited

U.S. PATENT DOCUMENTS 5,465,710 A * 11/1995 Miyagi ................ A61B 1/0055
138/123
5,988,226 A * 11/1999 Matthews ............... F16L 11/12
138/109
(Continued)

FOREIGN PATENT DOCUMENTS

JP   2013081655 A   5/2013
JP   2015165880 A   9/2015
(Continued)

OTHER PUBLICATIONS

PCT Written Opinion, PCT/JP2021/034717, Nov. 22, 2023.
International Search Report, PCT/JP2021/034717, Nov. 22, 2021.

*Primary Examiner* — Adam Marcetich
(74) *Attorney, Agent, or Firm* — MacMillan, Sobanski & Todd, LLC

(57) ABSTRACT

A catheter 30 includes a tube 31 provided with a tubular reinforcing member 311 having a plurality of wires W braided to intersect one another and a plastic layer 312 that covers the reinforcing member. The catheter 30 includes a pair of rings 32 and 33 configured to sandwich a distal end 311A of the reinforcing member from the inner periphery and the outer periphery.

17 Claims, 11 Drawing Sheets

(51) Int. Cl.
*A61M 60/13* (2021.01)
*A61M 60/38* (2021.01)

(52) U.S. Cl.
CPC ......... *A61M 60/38* (2021.01); *A61M 2207/00* (2013.01); *A61M 2207/10* (2013.01)

(58) Field of Classification Search
CPC ...... A61M 25/0068; A61M 2025/0059; A61M 2207/00; A61M 25/0009; A61M 60/13
See application file for complete search history.

(56) References Cited

U.S. PATENT DOCUMENTS

| | | | | |
|---|---|---|---|---|
| 6,523,862 | B1* | 2/2003 | MacDuff | B23D 77/12 |
| | | | | 285/256 |
| 11,333,281 | B1* | 5/2022 | Peterson | F01M 11/03 |
| 2003/0067161 | A1* | 4/2003 | Smith | F16L 19/0231 |
| | | | | 285/276 |
| 2004/0118470 | A1* | 6/2004 | Furuta | F16L 33/26 |
| | | | | 138/143 |
| 2004/0193140 | A1* | 9/2004 | Griffin | A61M 25/0068 |
| | | | | 604/524 |
| 2004/0212191 | A1* | 10/2004 | Segal | F16L 19/0286 |
| | | | | 285/903 |
| 2008/0016936 | A1* | 1/2008 | Schlitter | B26D 3/16 |
| | | | | 138/140 |
| 2008/0125752 | A1 | 5/2008 | Gunderson et al. | |
| 2008/0191472 | A1* | 8/2008 | Vieregge | F16L 19/028 |
| | | | | 285/256 |
| 2010/0179637 | A1* | 7/2010 | Dorn | A61F 2/95 |
| | | | | 623/1.11 |
| 2013/0018318 | A1* | 1/2013 | Ravichandran | A61M 25/005 |
| | | | | 604/171 |
| 2015/0035276 | A1* | 2/2015 | Shmelev | F16L 33/2071 |
| | | | | 285/382.4 |
| 2016/0001040 | A1 | 1/2016 | Yamaguchi et al. | |
| 2017/0136208 | A1* | 5/2017 | Hamuro | A61M 25/0012 |
| 2017/0368303 | A1 | 12/2017 | Nakayama et al. | |
| 2018/0335175 | A1* | 11/2018 | Moss, III | F16L 53/37 |
| 2019/0030280 | A1 | 1/2019 | Yokoyama | |
| 2019/0290884 | A1* | 9/2019 | Kanemasa | A61M 25/0012 |
| 2019/0366036 | A1* | 12/2019 | Jalgaonkar | A61M 25/008 |
| 2020/0155805 | A1* | 5/2020 | Sugawara | A61M 25/0147 |
| 2020/0188630 | A1 | 6/2020 | Fujita et al. | |
| 2021/0071792 | A1* | 3/2021 | Thrift | F16L 31/00 |

FOREIGN PATENT DOCUMENTS

| | | |
|---|---|---|
| JP | 2019037572 A | 3/2019 |
| WO | 2018051926 A1 | 3/2018 |

* cited by examiner

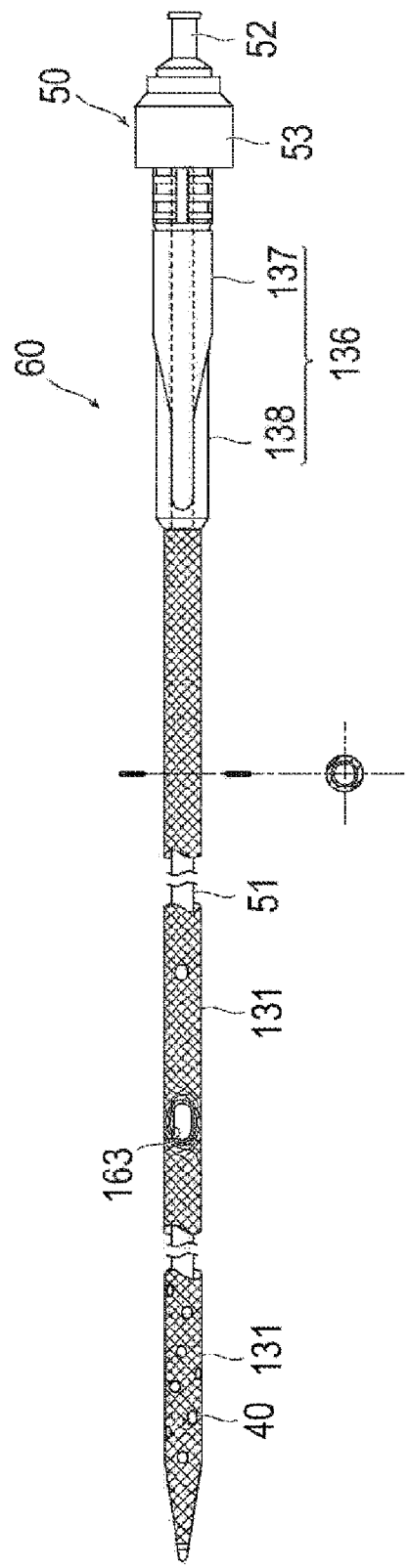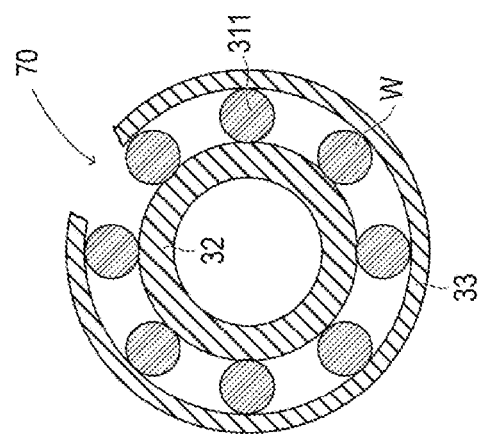

PERCUTANEOUS CATHETER

CROSS REFERENCE TO RELATED APPLICATIONS

This application is a continuation of PCT Application No. PCT/JP2021/034717, filed Sep. 22, 2021, based on and claiming priority to Japanese Application No. JP2020-164487, filed Sep. 30, 2020, both of which are incorporated herein by reference in their entirety.

BACKGROUND OF THE INVENTION

The present invention relates to a percutaneous catheter.

In the related art, percutaneous cardiopulmonary support (PCPS) has been provided for cardiopulmonary resuscitation, circulatory support, and respiratory support in emergency treatment. PCPS is a method for temporarily assisting and substituting cardiopulmonary function using an extracorporeal circulation device.

An extracorporeal circulation device includes an extracorporeal circulation circuit provided with, for example, a centrifugal pump, an oxygenator, a blood removal channel, and a blood supply channel and is configured to exchange gases in blood removed and supply the blood to the blood supply channel.

In this context, for example, published Japanese patent application JP2015-165880A discloses an extracorporeal circulation circuit of an extracorporeal circulation device. In the extracorporeal circulation circuit, a blood removal channel and a blood supply channel both employ a catheter (cannula) including a lumen that allows blood to flow.

Furthermore, JP2019-37572A discloses a catheter capable of preferably performing surgery in which the catheter is guided by a guidewire to a thin blood vessel such as a perforating branch.

In recent years, catheters with no distal end tip have been used in extracorporeal circulation circuits for the purpose of weight saving. In the catheter disclosed in JP2019-37572A, if a catheter without distal end tip is used in an extracorporeal circulation circuit in order to reduce weight, an undesirable bending stress may be applied to a distal end of the catheter.

SUMMARY OF THE INVENTION

The present invention has been made to solve the problem and an object of the invention is to provide a percutaneous catheter which preferably prevents wires in a catheter without a distal end tip from piercing a plastic layer and being exposed when operating the catheter and to provide a method for manufacturing the percutaneous catheter.

A percutaneous catheter is provided for achieving the object is a percutaneous catheter including a lumen that allows blood to flow, which may include: a tube provided with a tubular reinforcing member having a plurality of wires braided to intersect one another and a plastic layer that covers the tubular reinforcing member; and a pair of rings configured to sandwich a distal end of the tubular reinforcing member from an inner periphery and an outer periphery.

Furthermore, a method for manufacturing a percutaneous catheter for achieving the object is a method for manufacturing a percutaneous catheter including a lumen that allows blood to flow, wherein the method involves: setting an inner peripheral ring in an outer periphery of a cored bar; disposing a tubular reinforcing member having a plurality of wires braided to intersect one another in an outer periphery of the inner peripheral ring; and disposing an outer peripheral ring in an outer periphery of the tubular reinforcing member to swage the outer peripheral ring around the cored bar.

According to the percutaneous catheter with the above configuration, the distal end of the reinforcing member including the plurality of wires is sandwiched by the pair of rings, which prevents the wires from piercing the plastic layer and being exposed from distal ends of the pair of rings at the time of operating the catheter. This makes it possible to preferably prevent the wires from being exposed from the plastic layer.

Furthermore, according to the percutaneous catheter manufactured by the method for manufacturing a percutaneous catheter, since the distal end of the reinforcing member including the plurality of wires is sandwiched by the pair of rings, it is possible to prevent the wires from piercing the plastic layer and being exposed from the distal ends of the pair of rings when operating the catheter. This makes it possible to preferably prevent the wires from being exposed from the plastic layer.

BRIEF DESCRIPTION OF THE DRAWINGS

FIG. 15 is a plan view of the catheter according to the second embodiment after the stylet is inserted thereinto.

FIG. 16 is a cross-sectional view of the catheter showing a slit.

DETAILED DESCRIPTION OF PREFERRED EMBODIMENTS

Hereinafter, embodiments of the present invention will be described with reference to the accompanying drawings. Note that the following description does not limit the technical scope or the significance of each term disclosed in the claims. Furthermore, dimensional ratios of the drawings are exaggerated for illustration purpose and may differ from actual ratios.

Figure 1:
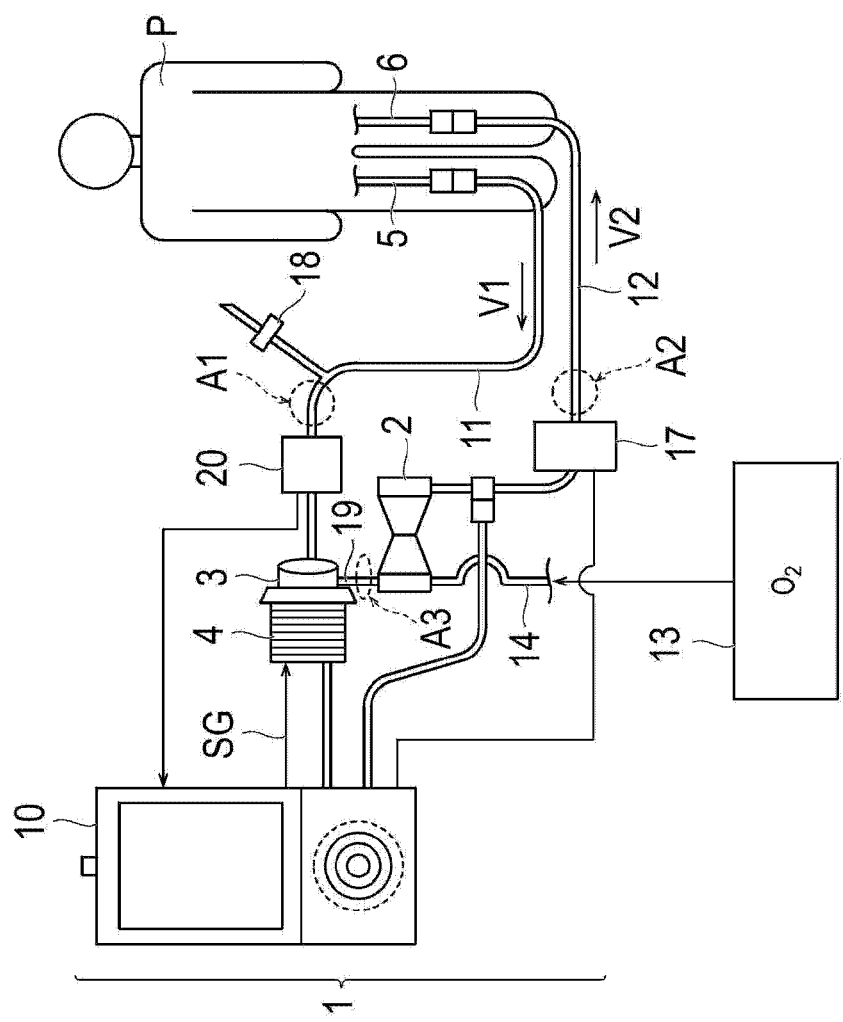
FIG. 1 is a system diagram illustrating an example of an extracorporeal circulation device employing a percutaneous catheter according to an embodiment of the invention.

FIG. 1 is a system diagram illustrating an example of an extracorporeal circulation device employing a percutaneous catheter according to an embodiment of the invention. The extracorporeal circulation device is used for percutaneous cardiopulmonary support (PCPS) in order to temporarily assist and substitute cardiopulmonary function of a patient with a weakened heart until recovery of heart function.

According to an extracorporeal circulation device 1, it is possible to perform surgery using a Veno-Arterial (VA) oxygenator. In this surgery, a pump is actuated to remove blood from a vein (vena cava) of a patient, and the oxygenator exchanges gases in the blood to oxygenate the blood, thereby returning the blood to an artery (aorta) of the patient. This extracorporeal circulation device 1 is used for assisting the heart and lungs. Hereinafter, a surgery to remove blood from a patient and perform predetermined treatment outside the body and return the blood into the patient's body will be referred to as "extracorporeal circulation".

As illustrated in FIG. 1, the extracorporeal circulation device 1 includes a circulation circuit for circulating blood. The circulation circuit includes an oxygenator 2, a centrifugal pump 3, a drive motor 4 as a drive unit for driving the centrifugal pump 3, a venous catheter (percutaneous catheter for blood removal) 5, an arterial catheter (catheter for blood supply) 6, and a controller 10 as a control unit.

The venous catheter (catheter for blood removal) 5 is inserted from the femoral vein, and through the inferior vena cava, a distal end of the venous catheter 5 is retained in the right atrium. The venous catheter 5 is connected to the centrifugal pump 3 through a blood removal tube (blood removal line) 11. The blood removal tube 11 is a channel for supplying blood.

The arterial catheter (catheter for blood supply) 6 is inserted from the femoral artery.

The drive motor 4 actuates the centrifugal pump 3 according to a command SG from the controller 10, causing the centrifugal pump 3 to remove blood from a patient P through the blood removal tube 11 and supply the blood to the oxygenator 2, and then, return the blood to the patient P through a blood supply tube (blood supply line) 12.

The oxygenator 2 is disposed between the centrifugal pump 3 and the blood supply tube 12. The oxygenator 2 exchanges gases in blood (oxygenates and/or decarbonates blood). The oxygenator 2 is, for example, a membrane oxygenator, and particularly preferably, a hollow fiber membrane oxygenator. To this oxygenator 2, an oxygen gas is supplied from an oxygen gas supply unit 13 through a tube 14. The blood supply tube 12 is a channel that connects the oxygenator 2 and the arterial catheter 6.

The blood removal tube 11 and the blood supply tube 12 may employ a channel including, for example, a synthetic resin such as vinyl chloride resin and silicone rubber having high transparency and flexibility that enables elastic deformation. In the blood removal tube 11, blood, or a liquid, flows in V1 direction. In the blood supply tube 12, blood flows in V2 direction.

In the circulation circuit illustrated in FIG. 1, an ultrasonic bubble detection sensor 20 is disposed in a part of the blood removal tube 11. A fast clamp 17 is disposed in a part of the blood supply tube 12.

Th ultrasonic bubble detection sensor 20 detects air bubbles mixed in the circulation circuit during the extracorporeal circulation which are caused by, for example, an erroneous operation of a three-way stopcock 18 and breakage of a tube. When the ultrasonic bubble detection sensor 20 detects air bubbles in blood being supplied to the blood removal tube 11, the ultrasonic bubble detection sensor 20 sends a detection signal to the controller 10. Based on this detection signal, the controller 10 issues an alarm and decreases the rotating speed of the centrifugal pump 3 or stops the centrifugal pump 3. Furthermore, the controller 10 commands the fast clamp 17 to immediately close the blood supply tube 12 by the fast clamp 17. This blocks air bubbles from being sent to the patient P's body. The controller 10 controls operation of the extracorporeal circulation device 1 to prevent air bubbles from entering the patient P' body.

The tube 11 (12 and 19) of the circulation circuit of the extracorporeal circulation device 1 is provided with a pressure sensor. The pressure sensor is attached to any one of or all of, for example, a fixing point A1 in the blood removal tube 11, a fixing point A2 in the blood supply tube 12 of the circulation circuit, or a fixing point A3 in the connecting tube 19 that connects the centrifugal pump 3 and the oxygenator 2. Accordingly, it is possible to measure pressure inside the tube 11 (12 and 19) during the extracorporeal circulation performed on the patient P by the extracorporeal circulation device 1. Note that the fixing point of the pressure sensor is not limited to the aforementioned fixing points A1, A2, and A3 and the pressure sensor may be attached to any points in the circulation circuit.

First Embodiment

With reference to FIGS. 2 to 6, a percutaneous catheter (hereinafter referred to as "catheter") 30 according to a first embodiment of the invention will be described. FIGS. 2 to 6 are views for describing configurations of the catheter 30 according to the first embodiment. This catheter 30 is used as the venous catheter (catheter for blood removal) 5 of FIG. 1.

Herein, a side of the catheter 30 that is inserted into a living body is referred to as "distal end" or "distal side" and a side closer to a hand of an operator is referred to as "proximal end" or "proximal side". A distal end portion represents a certain range including the distal end (the most distal end) and its periphery, while a proximal end portion represents a certain range including the proximal end (the most proximal end) and its periphery.

The catheter 30 according to this embodiment includes, as illustrated in FIGS. 2 to 6, a catheter tube 31 provided with a side hole 40 (corresponding to a tube), an inner peripheral ring 32 disposed at a distal end 31A of the catheter tube 31, an outer peripheral ring 33 disposed at the distal end 31A of the catheter tube 31, a clamping tube 34 disposed on the proximal side of the catheter tube 31, a catheter connector 35 for connecting the catheter tube 31 and the clamping tube 34, and a lock connector 36.

Figure 3:
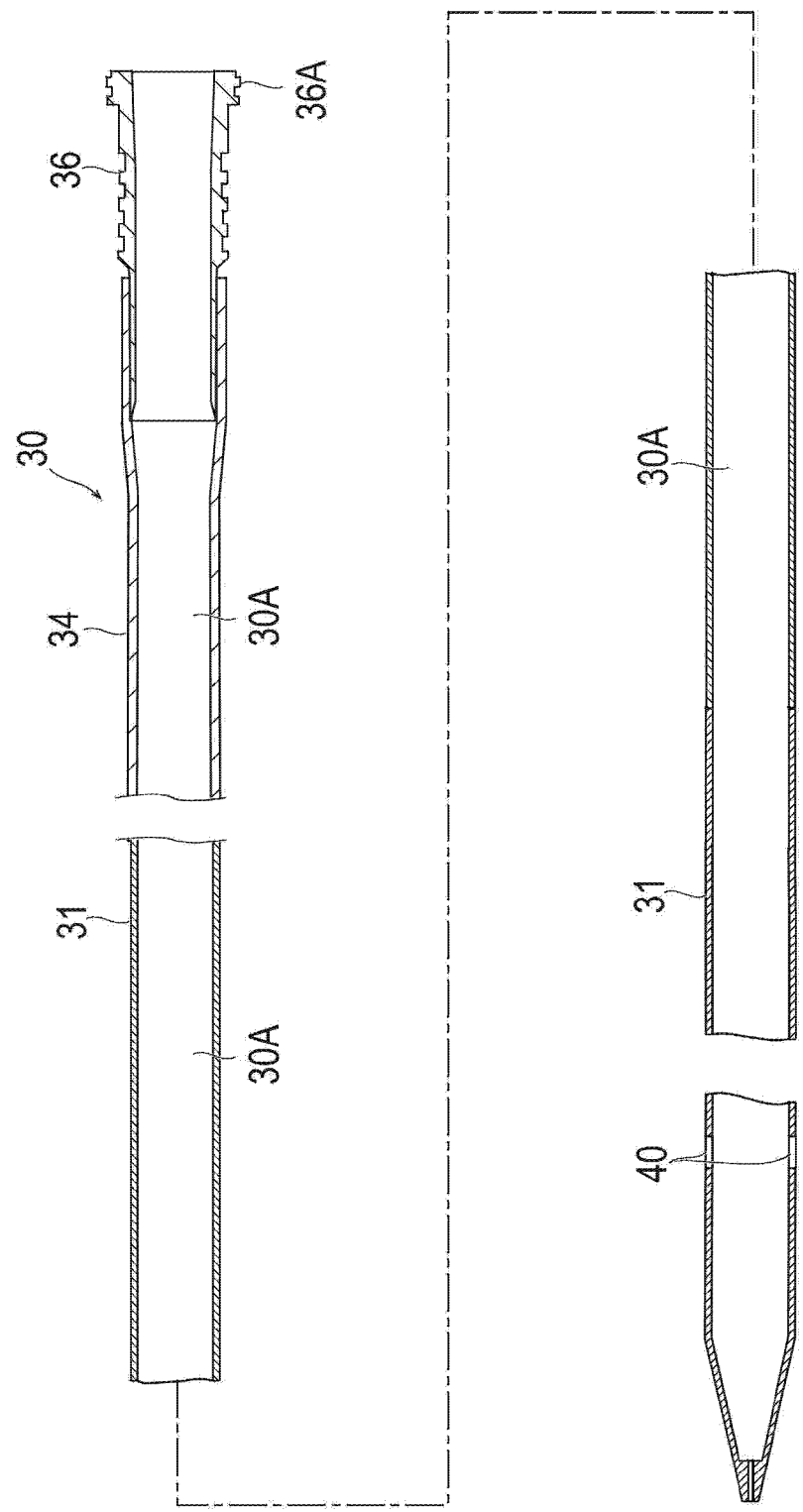
FIG. 3 is a sectional side view of the catheter according to the first embodiment.

As illustrated in FIG. 3, the catheter 30 includes a lumen 30A penetrating the catheter 30 from a distal end to a proximal end. The side hole 40 included in the catheter tube 31 is configured to remove blood efficiently when disposed in an object of blood removal within a living body.

Figure 2:
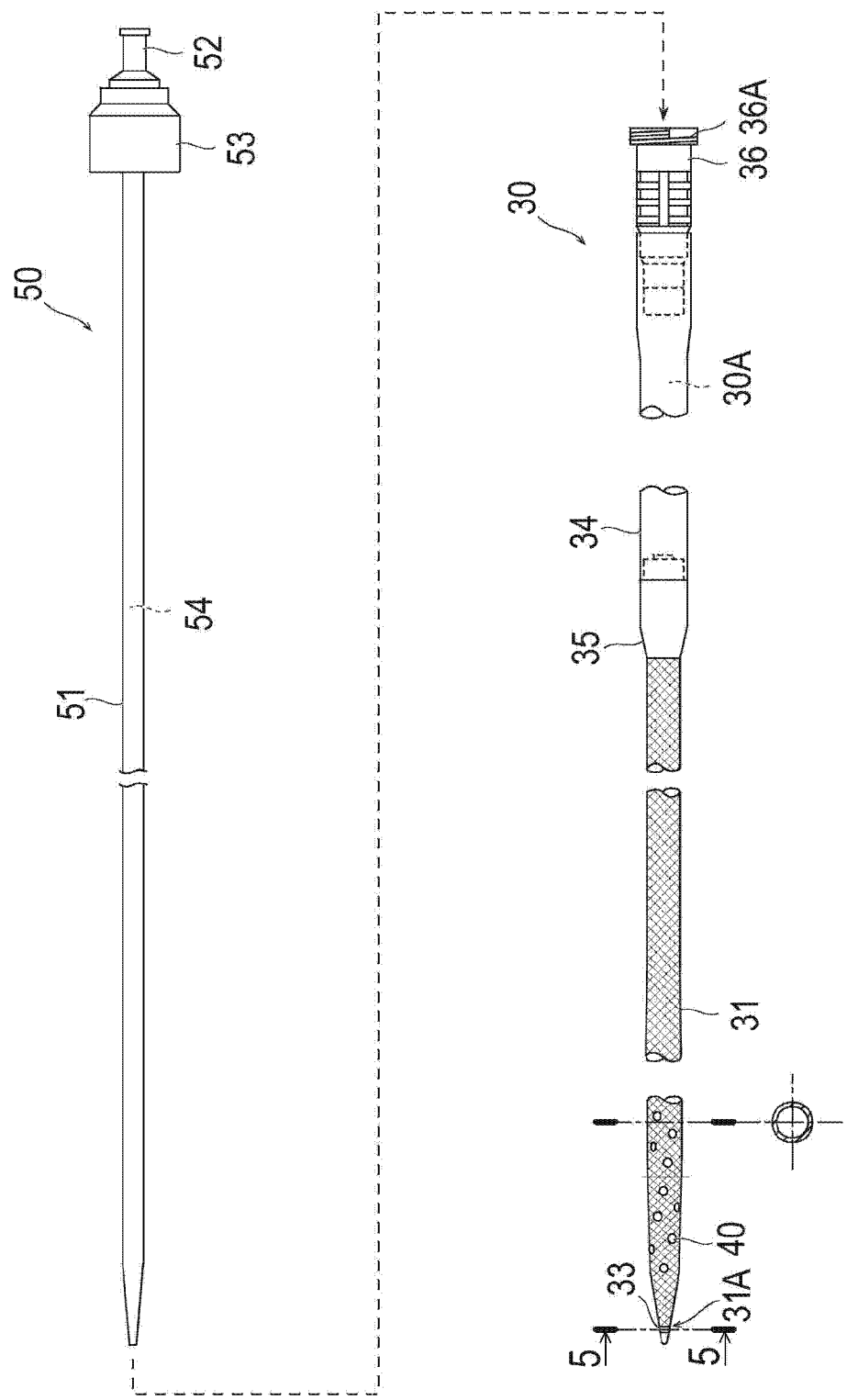
FIG. 2 is a side view illustrating a catheter according to a first embodiment before a stylet is inserted thereinto.

When the catheter 30 is inserted into the living body, a stylet 50 as illustrated in FIG. 2 is used. The stylet 50 is inserted into the lumen 30A of the catheter 30 and combined with the catheter 30 in advance, and then, inserted into the living body. How to use the catheter 30 will be described later.

Hereinafter described is each configuration of the catheter 30.

The catheter tube 31 has substantially constant inside and outside diameters. The catheter tube 31 has a length necessary for placing the side hole 40 of the catheter tube 31 in a desired object of blood removal. The catheter tube 31 has a length of, for example, 10 to 40 cm.

In this embodiment, the object of blood removal is the superior vena cava or the inferior vena cava. The catheter 30 is inserted into the living body and retained in such a manner that the side hole 40 is placed in the object of blood removal. The catheter tube 31 has an outside diameter of, for example, 4.3 to 10.3 mm. Furthermore, the catheter tube 31 has a thickness of, for example, 0.3 to 0.7 mm.

In addition, as illustrated in FIG. 2, the distal end 31A of the catheter tube 31 preferably has a portion tapered radially outward from the center of the catheter tube 31 in an axial direction. This enhances the insertability of the catheter tube 31.

Figure 4:
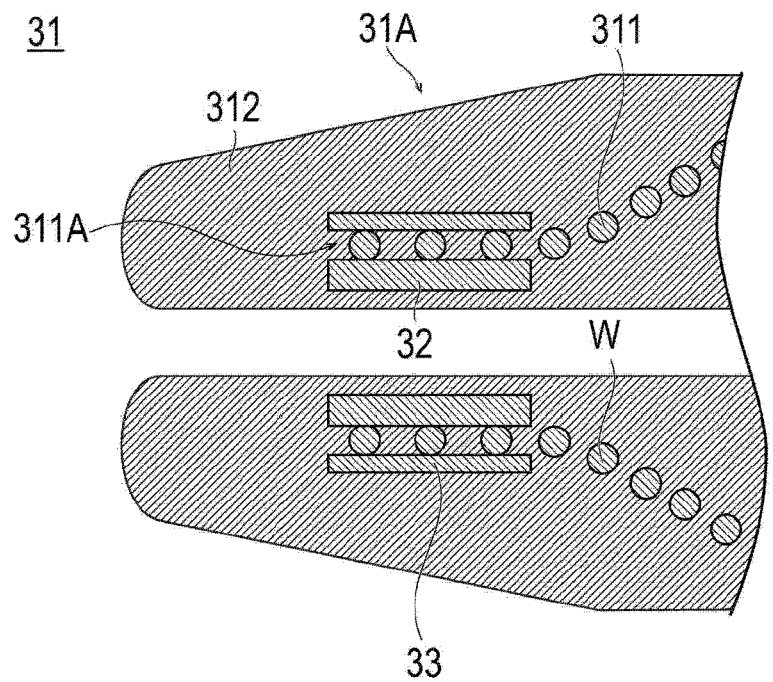
FIG. 4 is a sectional side view of an enlarged distal end of the catheter according to the first embodiment.
Figure 5:
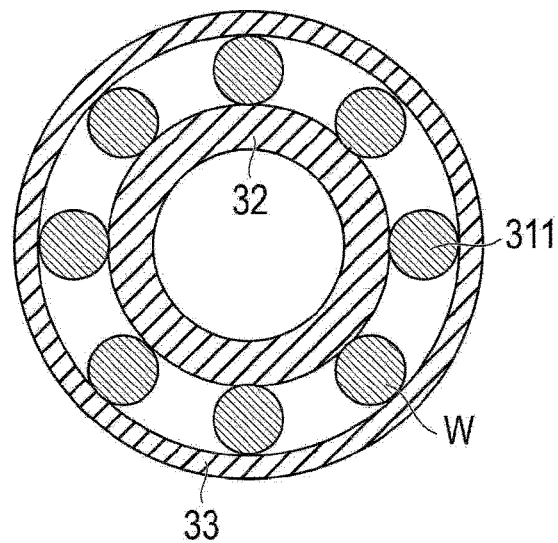
FIG. 5 is a cross-sectional view taken along line 5-5 of FIG. 2.

As illustrated in FIGS. 4 and 5, the catheter tube 31 includes a tubular reinforcing member 311 having a plurality of wires W braided to intersect one another and a tubular plastic layer 312 that covers the reinforcing member 311.

The wires W in this embodiment include a known shape-memory material such as shape-memory metal and shape-memory resin. Examples of the shape-memory metal include titanium-based alloys (such as Ni-Ti, Ti-Pd, and Ti-Nb-Sn) and copper-based alloys. Examples of the shape-memory resin include acrylic resin, trans-isoprene polymer, polynorbornene, styrene-butadiene copolymer, and polyurethane.

Each wire W preferably has a diameter of 0.1 mm to 0.2 mm.

In this embodiment, each wire W has a circular cross section, but the wires W are not limited thereto and may have a rectangular, square, or elliptical cross section. Because of helical braiding of wires W, they would not be extending perpendicular to the cross-sectional planes of FIGS. 4 and 5. For simplicity of the Figures, the cross sections of wires W are shown as circular.

The plastic layer 312 is formed using, for example, vinyl chloride, silicon, polyethylene, nylon, urethane, polyurethane, fluororesin, thermoplastic elastomer resin, or a composite material of these examples.

Silicon materials are highly biocompatible and soft and hardly damage a blood vessel. Polyethylene materials are soft and yet hard enough to withstand pressure. Polyethylene materials also have biocompatibility comparable to silicon materials. Polyethylene materials are harder than silicon and easier to insert into a thin blood vessel. Furthermore, polyurethane materials have a feature of becoming soft after insertion. The plastic layer 312 may employ an appropriate material, considering these features of each material.

Alternatively, a hydrophilic coating may be applied to a polyurethane material. A tube using such a material has a smooth surface, facilitates insertion into a blood vessel, and hardly damages the wall of a blood vessel. Blood and proteins are less likely to adhere to the surface, which offers the prospect of preventing thrombus formation.

As illustrated in FIG. 2, the catheter tube 31 includes the side hole 40. The side hole 40 penetrates a side surface of the catheter tube 31 excluding the distal end 31A, being opened to communicate with the lumen 30A of the catheter 30. The side hole 40 functions as a blood removal hole.

As illustrated in FIG. 2, a plurality of side holes 40 is disposed spirally along the axial direction. Note that the arrangement of the side holes 40 is not limited to spiral as long as the side holes 40 enable blood removal.

Each side hole 40 has a substantially circular shape and has a diameter of, for example, 0.5 mm to 5.0 mm. The number, inside diameter, and interval of the side holes 40 are set appropriately as necessary. A third side hole 46B is also not limited to a circular shape and may have, for example, a substantially elliptical shape.

The distal end 31A of the catheter tube 31 is provided with the inner peripheral ring 32 and the outer peripheral ring 33 as illustrated in FIGS. 2, 4, and 5. The reinforcing member 311 is disposed on the proximal side including the inner peripheral ring 32 and the outer peripheral ring 33. In other words, as illustrated in FIG. 4, the reinforcing member 311 does not extend beyond the distal side of the inner peripheral ring 32 and the outer peripheral ring 33, and the distal side of the inner peripheral ring 32 and the outer peripheral ring 33 are covered by the plastic layer 312.

As illustrated in FIGS. 4 and 5, the inner peripheral ring 32 is disposed at a distal end of, and in the inner periphery of, the reinforcing member 311. The inner peripheral ring 32 encloses the reinforcing member 311 together with the outer peripheral ring 33.

The inner peripheral ring 32 has an axial length of, for example, 1.0 to 5.0 mm. Furthermore, the inner peripheral ring 32 has a thickness of, for example, 0.1 to 0.3 mm. The inner peripheral ring 32 has an inside diameter of, for example, 1.6 to 2.0 mm.

The inner peripheral ring 32 is not limited in material and includes, for example, a metal. Preferable examples of the metal include gold, platinum, SUS, and tungsten which are suitable for radiographic visualization. Alternatively, the inner peripheral ring 32 may include a plastic material containing the above metals.

As illustrated in FIGS. 4 and 5, the outer peripheral ring 33 is disposed at the distal end 311A and in the outer periphery of the reinforcing member 311. The outer peripheral ring 33 is swaged with the inner peripheral ring 32 so as to hold reinforcing member 311 together with the inner peripheral ring 32. In other words, the distal end 311A of the reinforcing member 311 is housed between the inner peripheral ring 32 and the outer peripheral ring 33.

The outer peripheral ring 33 has an axial length of, for example, 1.0 to 5.0 mm. Furthermore, the outer peripheral ring 33 is equal to or smaller than the inner peripheral ring 32 in thickness and has a thickness of, for example, 0.1 to 0.3 mm. The outer peripheral ring 33 has an inside diameter of, for example, 1.8 to 3.0 mm.

When the outer peripheral ring 33 has a thickness smaller than that of the inner peripheral ring 32, in a step of swaging the outer peripheral ring 33 around the cored bar 300 as described later, the outer peripheral ring 33 is deformed and swaged more preferentially than the inner peripheral ring 32.

Distal ends of the inner peripheral ring 32 and the outer peripheral ring 33 are coplanar in the axial direction as illustrated in FIG. 4. With this configuration, outside forces acting upon the pair of rings 32 and 33 via the plastic layer 312 are dispersed across the distal ends of the pair of rings 32 and 33. Accordingly, it is possible to preferably prevent the wires W from piercing the plastic layer 312 and being exposed.

The outer peripheral ring 33 is not particularly limited in material and may employ the material included in the inner peripheral ring 32.

Figure 6:
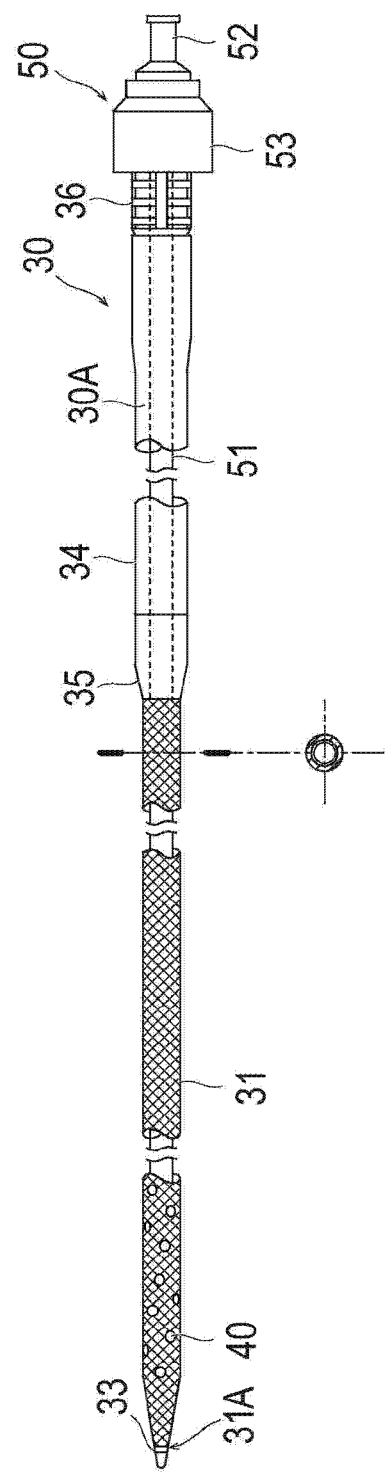
FIG. 6 is a side view illustrating the catheter according to the first embodiment after the stylet is inserted thereinto.

As illustrated in FIGS. 2, 3, and 6, the clamping tube 34 is disposed on the proximal side of the catheter tube 31. The inside of the clamping tube 34 is provided with a lumen through which the stylet 50 is inserted. The clamping tube 34 is formed using a material similar to one used in the catheter tube 31.

The catheter connector 35 connects the catheter tube 31 and the clamping tube 34 as illustrated in FIGS. 2 and 6. The inside of the catheter connector 35 is provided with a lumen through which the stylet 50 is inserted.

As illustrated in FIGS. 2, 3, and 6, the lock connector 36 is connected to the proximal side of the clamping tube 34. The inside of the lock connector 36 is provided with a lumen through which the stylet 50 is inserted. The proximal side of the lock connector 36 has the outer surface including a male screw 36A provided with a thread.

Next, a configuration of the stylet 50 will be described.

As illustrated in FIG. 2, the stylet 50 includes a stylet tube 51 stretching in the axial direction, a stylet hub 52 fixed to a proximal end of the stylet tube 51, and a screw ring 53 disposed at a distal end of the stylet hub 52.

The stylet tube 51 stretches in the axial direction, having an elongated body with relatively high rigidity. An entire axial length of the stylet tube 51 is substantially equal to an entire axial length of the catheter 30. The stylet tube 51 includes a guidewire lumen 54 through which a guidewire (not illustrated) is inserted. The stylet tube 51 is guided by the guidewire and inserted into the living body together with the catheter 30. After the catheter 30 is retained in the living body, the stylet hub 52 is pulled toward the proximal side, thereby removing the stylet tube 51 from the catheter 30.

The stylet tube 51 has relatively high rigidity and springiness (a force to push back). Due to the springiness, a pushing force toward the distal side caused by a hand operation is transferred to the catheter tube 30. For this reason, when the stylet tube 51 is pushed toward the distal side while fixed to the catheter 30, the stylet tube 51 plays a role of expanding a narrow blood vessel.

The screw ring 53 includes a lumen having the inner surface including a female screw (not illustrated) provided with a thread groove. When the female screw of the screw ring 53 is screwed in the male screw 36A of the lock connector 36, the stylet 50 is attached to the catheter 30.

<Method for Manufacturing Catheter>

With reference to FIGS. 7 to 12, hereinafter described is a method for manufacturing the catheter 30 according to the first embodiment. FIGS. 7 to 12 are views for describing the method for manufacturing the catheter 30 according to the first embodiment. FIGS. 7 to 11 each show a substantially half circumference of the sectional side view.

The method for manufacturing the catheter 30 according to the first embodiment broadly involves: forming the reinforcing member 311 including openings (step S01), setting the inner peripheral ring 32 in the outer periphery of the cored bar 300 (step S02), disposing the reinforcing member 311 in the outer periphery of the inner peripheral ring 32 (step S03), disposing the outer peripheral ring 33 in the outer periphery of the reinforcing member 311 (step S04), swaging the outer peripheral ring 33 around the cored bar 300 (step S05), cutting the wires W exposed from the distal ends of the inner peripheral ring 32 and the outer peripheral ring 33 (step S06), covering the reinforcing member 311 with resin (step S07), and perforating parts of the plastic layer 312 corresponding to the openings of the reinforcing member 311 to form the side holes 40 (step S08). Each step will now be described in detail.

First, the tubular reinforcing member 311 is formed by braiding the plurality of wires W to intersect one another (step S01). Step S01 involves a step of braiding the wires W to form a braid, a step of providing the braid with openings (which later becomes the side holes 40), and a step of applying heat to the braid to form a shape-memory braid. Since a method disclosed in WO2017/175531 may be employed as step S01, details will not be described herein. WO2017/175531 (and corresponding publication US2019/0030280A1) are incorporated herein by reference in their entirety.

Figure 7:
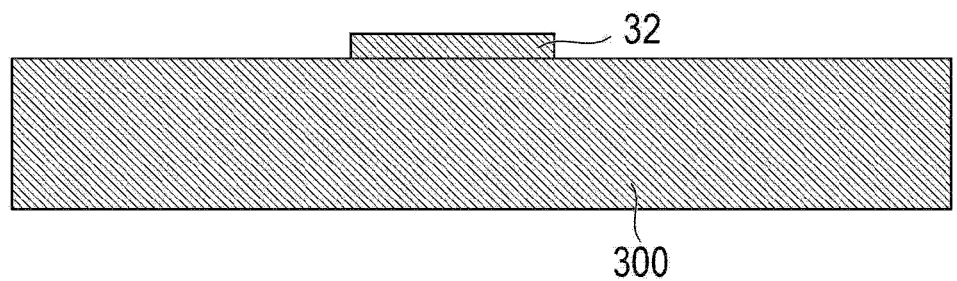
FIG. 7 is a sectional side view for describing a method for manufacturing the catheter according to the first embodiment and illustrating an inner peripheral ring set in the outer periphery of a cored bar.

Next, as illustrated in FIG. 7, the inner peripheral ring 32 is set in the outer periphery of the cored bar 300 (step S02). The inner peripheral ring 32 is set around the cored bar 300 not to slide in the axial direction unintentionally.

Figure 8:
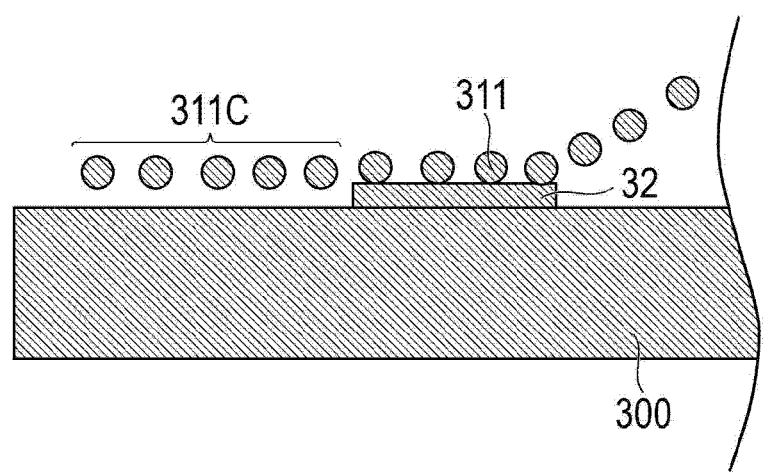
FIG. 8 is a sectional side view for describing the method for manufacturing the catheter according to the first embodiment and illustrating a reinforcing member disposed in the outer periphery of the inner peripheral ring.

Next, as illustrated in FIG. 8, the tubular reinforcing member 311 formed in step S01 is disposed in the outer periphery of the inner peripheral ring 32 (step S03). At this time, in the reinforcing member 311, a section 311C in the distal end where the wires W are not braided protrudes on the distal side of the inner peripheral ring 32.

Figure 9:
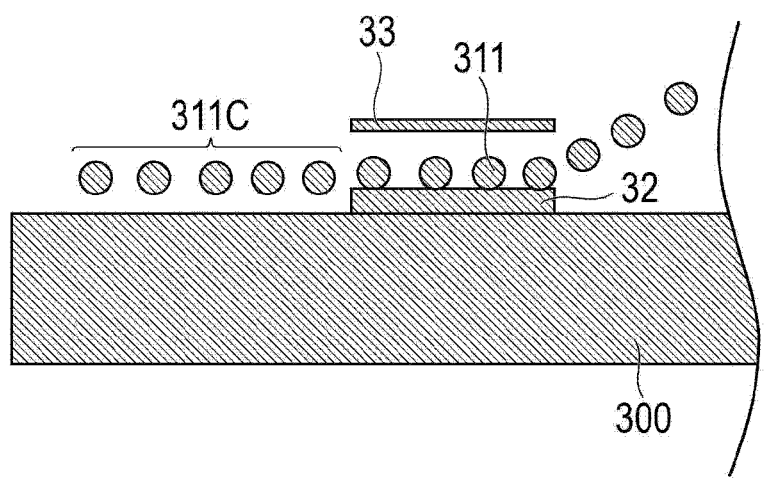
FIG. 9 is a sectional side view for describing the method for manufacturing the catheter according to the first embodiment and illustrating a state before swaging an outer peripheral ring around the cored bar.

Next, as illustrated in FIG. 9, the outer peripheral ring 33 is disposed in the outer periphery of the reinforcing member 311 (step S04). Between the outer peripheral ring 33 and the reinforcing member 311, there is a clearance of a predetermined size for swaging.

Figure 10:
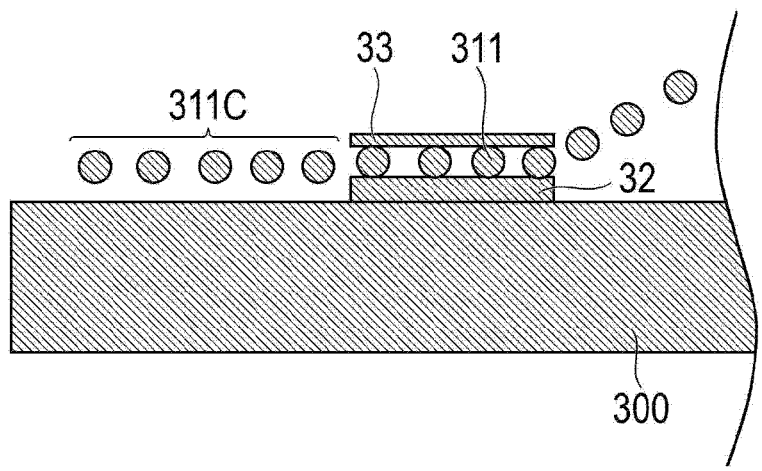
FIG. 10 is a sectional side view for describing the method for manufacturing the catheter according to the first embodiment and illustrating a state after swaging the outer peripheral ring around the cored bar.

Next, as illustrated in FIG. 10, the outer peripheral ring 33 is swaged around the cored bar 300 (step S05). As described above, the outer peripheral ring 33 has a thickness smaller than that of the inner peripheral ring 32, the outer peripheral ring 33 is deformed preferentially and swaged. The outer peripheral ring 33 may be swaged around the cored bar 300 either manually or automatically. Through this step, the reinforcing member 311 is sandwiched by the inner peripheral ring 32 and the outer peripheral ring 33.

Figure 11:
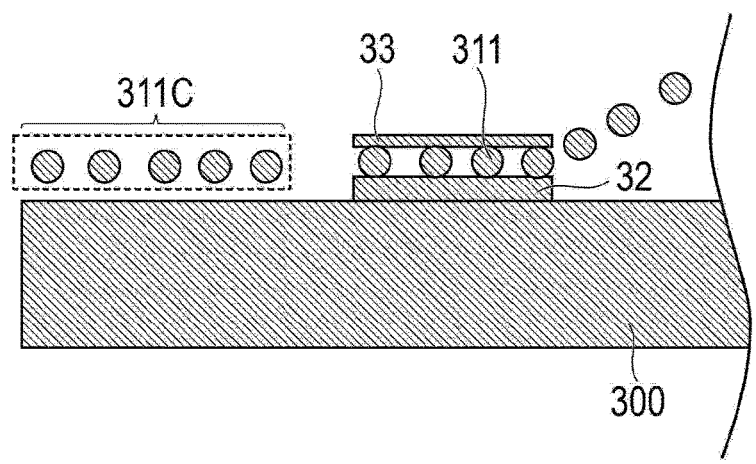
FIG. 11 is a sectional side view for describing the method for manufacturing the catheter according to the first embodiment and illustrating a state in which the reinforcing member protruded from distal ends of the inner peripheral ring and the outer peripheral ring is to be cut.

As illustrated in FIG. 11, the next step is to cut the section 311C in the distal end of the reinforcing member 311 where the wires W are not braided (step S06).

Figure 12:
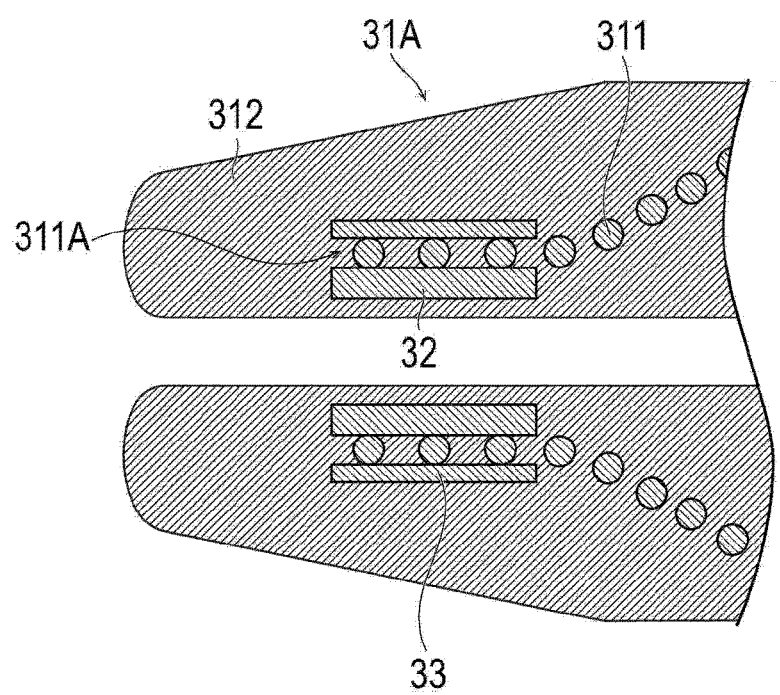
FIG. 12 is a sectional side view for describing the method for manufacturing the catheter according to the first embodiment and illustrating a state after impregnating a reinforcing member with resin to form a plastic layer.

Next, as illustrated in FIG. 12, the reinforcing member 311 is covered by resin to form the plastic layer 312 (step S07). A method for applying resin to the reinforcing member 311 is not particularly limited and may employ immersion (dipping) or insert molding.

In the immersion, the reinforcing member 311 is immersed in a solution including resin, followed by drying the solution, thereby forming the plastic layer 312 on the surface of the reinforcing member 311. The immersion time is not particularly limited and may be 5 to 30 seconds. The reinforcing member 311 may be immersed in a solution for a plurality of times. After the application, the solution is dried to form the plastic layer 312 on the reinforcing member 311. The temperature and time for drying are not particularly limited, and the solution is preferably dried at a temperature of 20 to 80° C. for 15 minutes to 5 hours. Examples of a device used for the drying include oven, dryer, and microwave heating device.

The next step is to perforate parts of the plastic layer 312 corresponding to the openings of the reinforcing member 311 to form the side holes 40 (step S08). Specifically, the parts of the plastic layer 312 corresponding to the openings of the reinforcing member 311 are punched out to form the side holes 40.

By this manufacturing method, the catheter 30 according to the first embodiment is obtained.

<How to Use Catheter>

Hereinafter described is how to use the catheter 30. FIG. 2 illustrates a state before the stylet tube 51 of the stylet 50 is inserted into the lumen 30A of the catheter 30, and FIG. 6 illustrates a state after stylet tube 51 is inserted into the lumen 30A of the catheter 30.

First, as illustrated in FIG. 6, the stylet tube 51 of the stylet 50 is inserted into the lumen 30A of the catheter 30. After that, the proximal end of the catheter 30 is fixed to the stylet hub 52.

Next, the catheter 30 into which the stylet 50 is inserted is inserted along the guidewire (not illustrated) which is inserted into a target site in a living body in advance.

The catheter 30 is inserted into the living body until the side holes 40 of the catheter tube 31 reach the inferior vena cava, and the catheter 30 is retained.

Next, the stylet tube 51 and the guidewire are removed from the catheter 30. At this time, the stylet tube 51 and the guidewire are pulled out to the position of the clamping tube 34 of the catheter 30 and clamped by a pair of forceps (not illustrated), and then, the stylet tube 51 and the guidewire are completely removed from the catheter 30.

Next, the lock connector 36 of the catheter 30 is connected to the blood removal tube 11 of the extracorporeal circulation device of FIG. 1. After confirming that the connection of the catheter for blood supply is completed, the pair of forceps of the clamping tube 34 is released to start extracorporeal circulation.

On completion of the extracorporeal circulation, the catheter 30 is removed from the blood vessel, and the insertion site is repaired by surgical hemostasis as necessary.

As described above, the catheter 30 according to this embodiment includes the lumen 30A that allows blood to flow. The catheter 30 includes the catheter tube 31 provided with the tubular reinforcing member 311 having the plurality of wires W braided to intersect one another and the plastic layer 312 that covers the reinforcing member 311, and the catheter 30 includes the pair of rings 32 and 33 configured to sandwich the distal end 311A of the reinforcing member 311 from the inner periphery and the outer periphery. According to the catheter 30 with such a configuration, since the pair of rings 32 and 33 sandwiches the distal end 311A of the reinforcing member 311 including the plurality of wires W, it is possible to prevent the wires W from piercing the plastic layer 312 and being exposed from the distal ends of the rings 32 and 33 when operating the catheter 30. Accordingly, it is possible to preferably prevent the wires W from being exposed from the plastic layer 312.

Furthermore, the distal ends of the pair of rings 32 and 33 are coplanar in the axial direction. According to the catheter 30 with such a configuration, since force with which the pair of rings 32 and 33 intends to be exposed from the plastic layer 312 is dispersed in the pair of rings 32 and 33, it is possible to prevent the wires W from piercing the plastic layer 312 more preferably.

In addition, the outer peripheral ring 33 of the pair of rings 32 and 33 disposed in the outer periphery has a thickness smaller than that of the inner peripheral ring 32 disposed in the inner periphery. According to the catheter 30 with such a configuration, when the outer peripheral ring 33 is swaged around the cored bar 300, the outer peripheral ring 33 is preferentially deformed, which enables the outer peripheral ring 33 to be swaged around the cored bar 300 preferably.

As described above, the method for manufacturing the catheter 30 according to this embodiment is a method for manufacturing the catheter 30 including the lumen 30A that allows blood to flow. The method for manufacturing the catheter 30 involves: setting the inner peripheral ring 32 in the outer periphery of the cored bar 300; disposing the tubular reinforcing member 311 having the plurality of wires W braided to intersect one another in the outer periphery of the inner peripheral ring 32; and disposing the outer peripheral ring 33 in the outer periphery of the reinforcing member 311 to swage the outer peripheral ring 33 around the cored bar 300. According to the catheter 30 manufactured by this manufacturing method, since the pair of rings 32 and 33 sandwiches the distal end 311A of the reinforcing member 311 including the plurality of wires W, it is possible to prevent the wires W from piercing the plastic layer 312 and being exposed from the distal ends of the rings 32 and 33 when operating the catheter 30. Accordingly, it is possible to preferably prevent the wires W from piercing the plastic layer 312 and being exposed.

Second Embodiment

Figure 13:
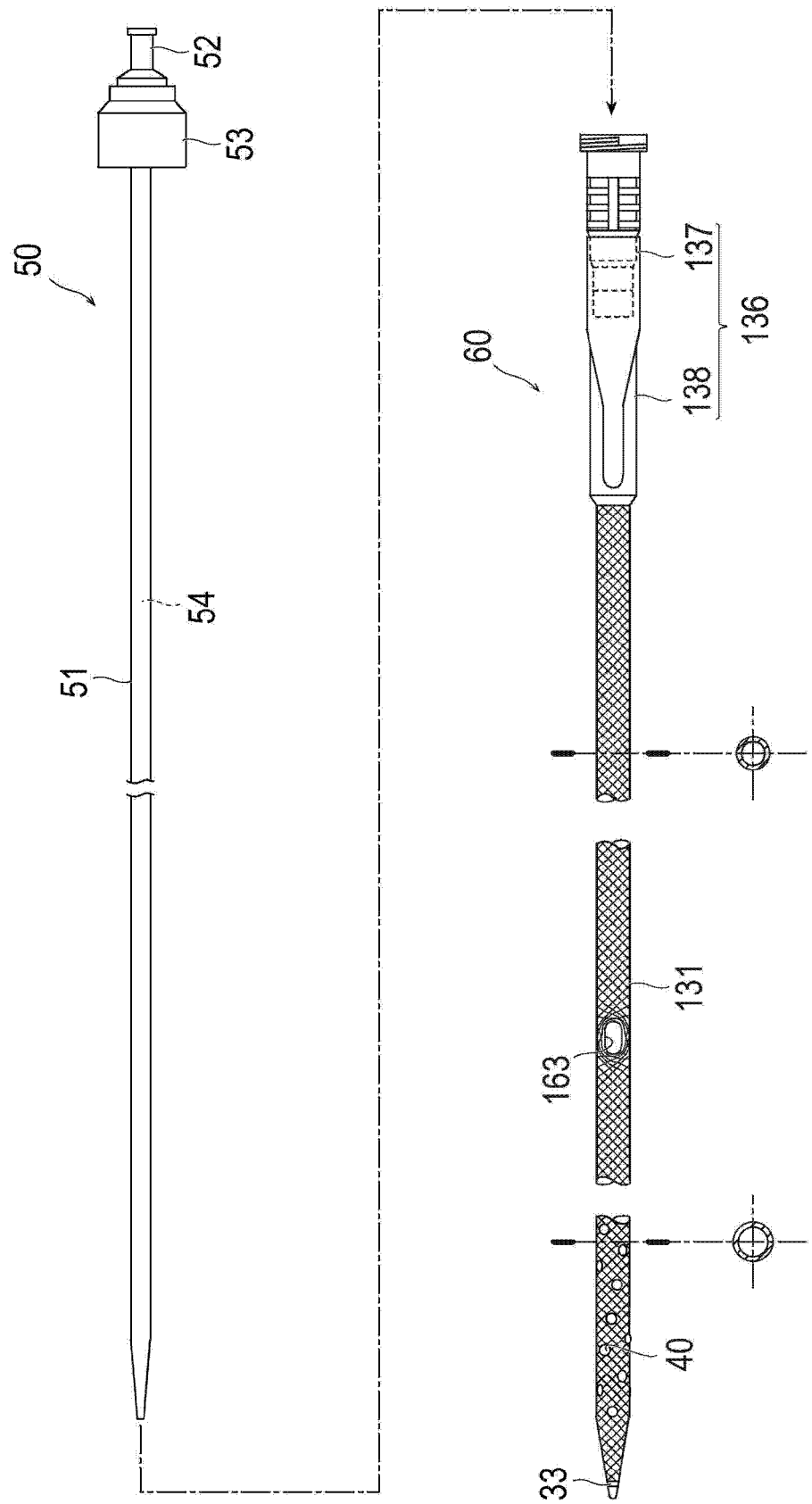
FIG. 13 is a plan view illustrating a catheter according to a second embodiment before a stylet is inserted thereinto.
Figure 14:
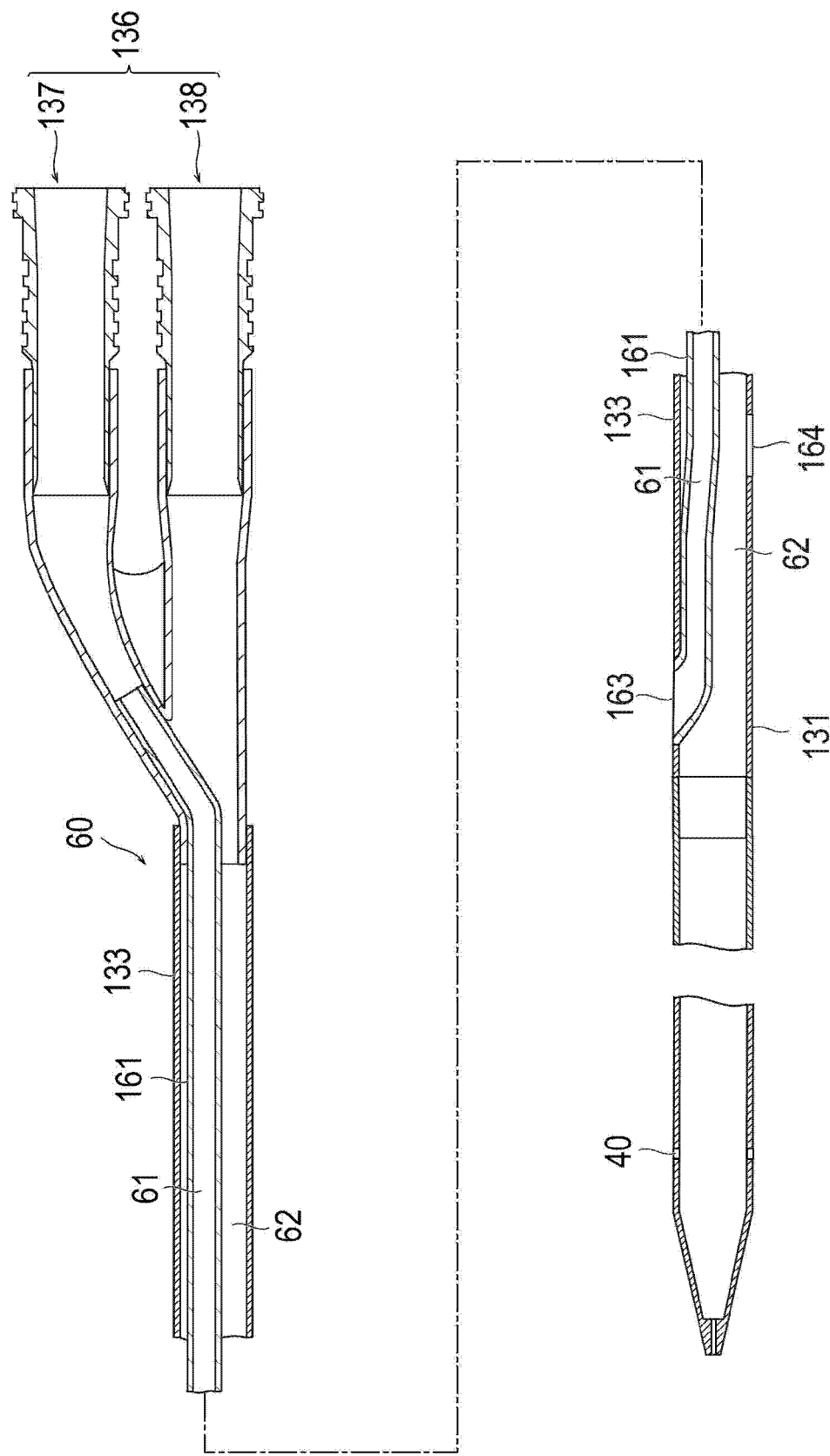
FIG. 14 is a sectional side view of the catheter according to the second embodiment.

With reference to FIGS. 13 to 15, a percutaneous catheter (hereinafter referred to as "catheter") 60 according to a second embodiment of the invention will be described. FIGS. 13 to 15 are views for describing configurations of the catheter 60 according to the second embodiment.

This catheter 60 is what is called a double lumen catheter configured to perform blood supply and blood removal simultaneously. Therefore, in this embodiment, surgery is performed with one catheter 60 instead of two catheters, that is, the venous catheter (catheter for blood removal) 5 and the arterial catheter (catheter for blood supply) 6 used in the extracorporeal circulation device of FIG. 1.

As illustrated in FIGS. 13 and 14, the catheter 60 according to this embodiment differs from the catheter 30 according to the first embodiment in that a second tube 161 including a first lumen 61 communicating with a side hole for blood supply 163 has a double tube structure disposed in a lumen of a first tube 131.

According to the catheter 60, it is possible to perform extracorporeal circulation using a Veno-Venous (VV) oxygenator. In this extracorporeal circulation, a pump of an extracorporeal circulation device is actuated to remove blood from a vein (vena cava) of a patient, and the oxygenator exchanges gases in the blood to oxygenate the blood, thereby returning the blood to the vein (vena cava) of the patient.

Hereinafter described is each configuration of the catheter 60. Note that configurations common to the first embodiment will not be described, and configurations characteristic of the second embodiment will be described. In addition, the same parts as those of the first embodiment will be denoted by the same reference numerals, and redundant description will be omitted.

As illustrated in FIGS. 13 to 15, the catheter 60 includes the first tube 131, an inner peripheral ring 32 disposed at a distal end of the first tube 131, an outer peripheral ring 33 disposed at the distal end of the first tube 131, and the second tube 161 disposed in a lumen of the first tube 131. The first tube 131 according to the second embodiment corresponds to the catheter tube 31 according to the first embodiment. Since the inner peripheral ring 32 and the outer peripheral ring 33 are disposed at the distal end of the first tube 131 as in the first embodiment, the description will be omitted.

As illustrated in FIG. 14, the catheter 60 includes the first lumen 61 functioning as a blood supply channel and a second lumen 62 functioning as a blood removal channel.

The first lumen 61 is formed in a lumen of the second tube 161. The second lumen 62 is formed in the lumen of the first tube 131, penetrating the first tube 131 from the distal end to the proximal end.

The first tube 131 is provided with the side hole for blood supply 163 which communicates with the first lumen 61 serving as the blood supply channel.

The first tube 131 is provided with a side hole for blood removal 164 which communicates with the second lumen 62 serving as the blood removal channel.

The side hole for blood supply 163 and the side hole for blood removal 164 have an elliptical shape.

The second tube 161 is inserted into the second lumen 62 from the proximal side of the first tube 131 and linked to the side hole for blood supply 163.

The side hole for blood supply 163 is disposed in an object of blood supply within a living body, and blood oxygenated by the oxygenator is supplied to the living body through the side hole for blood supply 163.

The side holes 40 and the side hole for blood removal 164 included in the first tube 131 are disposed in different objects of blood removal in the living body and are configured to remove blood efficiently. Furthermore, even when one of the side holes 40 and the side hole for blood removal 164 sticks to a blood vessel wall and the hole is closed, blood is removed from other holes that are not closed, which enables stable extracorporeal circulation.

In this embodiment, the catheter 60 is inserted from the internal jugular vein in the neck and a distal end of the catheter 60 is retained in the inferior vena cava through the superior vena cava and the right atrium. The right atrium is an object of blood supply, and the superior vena cava and the inferior vena cava are both objects of blood removal.

As illustrated in FIG. 15, while the stylet 50 is inserted into the catheter 60, the catheter 60 is inserted and retained in the living body in such a manner that the side holes 40 of the first tube 131 are placed in the inferior vena cava and the side hole for blood removal 164 of the first tube 131 is placed in the internal jugular vein.

As illustrated in FIG. 13, the lock connector 136 includes a first lock connector 137 communicating with the first lumen 61 and a second lock connector 138 disposed in parallel with the first lock connector 137 and communicating with the second lumen 62. The lock connector 136 is a Y-shaped Y connector formed by branching the first lock connector 137 from the second lock connector 138.

The first lock connector 137 is coupled to a proximal end portion of the second tube 161. The second lock connector 138 is coaxially coupled to a proximal end portion of the first tube 131. A blood supply tube (blood supply line) is connected to the first lock connector 137, and a blood removal tube (blood removal line) is connected to the second lock connector 138.

In this manner, according to the catheter 60 according to this embodiment, one catheter plays a role of both removing and supplying blood.

Although the catheter according to the invention has been described through the embodiments, the invention is not limited to the configurations described in the embodiments and modifications thereof and is appropriately changed based on the claims.

For example, in the first embodiment, the distal ends of the pair of rings 32 and 33 are coplanar in the axial direction, but the distal ends of the pair of rings 32 and 33 are not necessarily coplanar in the axial direction.

In addition, in the first embodiment, the outer peripheral ring 33 has a thickness smaller than that of the inner peripheral ring 32. However, the outer peripheral ring 33 and the inner peripheral ring 32 may have the same thickness, and the outer peripheral ring 33 may be provided with a slit 70 as shown in FIG. 16. With this configuration, when the outer peripheral ring 33 is swaged, the outer peripheral ring 33 is deformed preferentially.

In addition, in the first embodiment, the outer peripheral ring 33 has a thickness smaller than that of the inner peripheral ring 32. However, the outer peripheral ring and the inner peripheral ring may have the same thickness, and the outer peripheral ring may include a material softer than the material included in the inner peripheral ring. With this configuration, when the outer peripheral ring is swaged, the outer peripheral ring is deformed preferentially.

Furthermore, the material included in the wires W is not limited to a shape-memory material as long the material has a restoring force that enables it to return to its original shape and has a function of reinforcing the plastic layer, and the wires W may employ, for example, a known elastic material.

What is claimed is:

1. A percutaneous catheter defining a lumen that allows blood to flow when the percutaneous catheter is inserted into a living body, the percutaneous catheter comprising:
   a tubular reinforcing member having a plurality of wires braided to intersect one another;
   a pair of rings configured to sandwich a distal end of the tubular reinforcing member, comprising an inner peripheral ring at an inner periphery of the tubular reinforcing member and an outer peripheral ring at an outer periphery of the tubular reinforcing member, wherein the inner and outer peripheral rings have respective distal ends being coplanar in an axial direction; and
   a tubular plastic layer covering the tubular reinforcing member and the pair of rings.

2. The percutaneous catheter according to claim 1, wherein the outer peripheral ring has a radial thickness smaller than a radial thickness of the inner peripheral ring.

3. The percutaneous catheter according to claim 1, wherein the outer peripheral ring is provided with a slit.

4. The percutaneous catheter according to claim 1, wherein the outer peripheral ring comprises a first material and the inner peripheral ring comprises a second material, wherein the first material is softer than the second material.

5. The percutaneous catheter according to claim 1 wherein the inner peripheral ring has a right circular cylinder shape.

6. The percutaneous catheter according to claim 5 wherein the outer peripheral ring has a right circular cylinder shape.

7. The percutaneous catheter according to claim 1 wherein the outer peripheral ring has a right circular cylinder shape.

8. The percutaneous catheter according to claim 7 wherein the tubular plastic layer has an outer surface adjacent to a distal end of the percutaneous catheter that tapers radially inward as it extends toward the distal end of the percutaneous catheter.

9. A method for manufacturing a percutaneous catheter including a lumen that allows blood to flow when the percutaneous catheter is inserted into a living body, the method comprising the steps of:
   setting an inner peripheral ring on an outer periphery of a cored bar;
   disposing a tubular reinforcing member having a plurality of wires braided to intersect one another onto an outer periphery of the inner peripheral ring;
   disposing an outer peripheral ring on an outer periphery of the tubular reinforcing member, wherein the inner and outer peripheral rings are arranged to have respective distal ends being coplanar in an axial direction;

swaging the outer peripheral ring around the cored bar to sandwich a distal end of the tubular reinforcing member; and covering the tubular reinforcing member, inner peripheral ring, and outer peripheral ring in a plastic layer.

10. The method of claim 9 further comprising the step of:

cutting the tubular reinforcing member at the inner and outer peripheral rings prior to the covering step to form the distal end of the tubular reinforcing member at a distal end of the inner and outer peripheral rings.

11. The method of claim 9 wherein the outer peripheral ring has a radial thickness smaller than a radial thickness of the inner peripheral ring.

12. The method of claim 9 wherein the outer peripheral ring is provided with a slit which facilitates the swaging step.

13. The method of claim 9 wherein the outer peripheral ring comprises a first material and the inner peripheral ring comprises a second material, wherein the first material is softer than the second material.

14. The method of claim 9 wherein the inner peripheral ring has a right circular cylinder shape.

15. The method of claim 14 wherein the outer peripheral ring has a right circular cylinder shape.

16. The method of claim 9 wherein the outer peripheral ring has a right circular cylinder shape.

17. The method of claim 9 wherein the plastic layer is formed having an outer surface adjacent to a distal end of the percutaneous catheter that tapers radially inward as it extends toward the distal end of the percutaneous catheter.

\* \* \* \* \*